Dec. 1, 1925.
O. FEST
SAUSAGE BROILER
Filed June 26, 1925
1,563,973
2 Sheets-Sheet 1
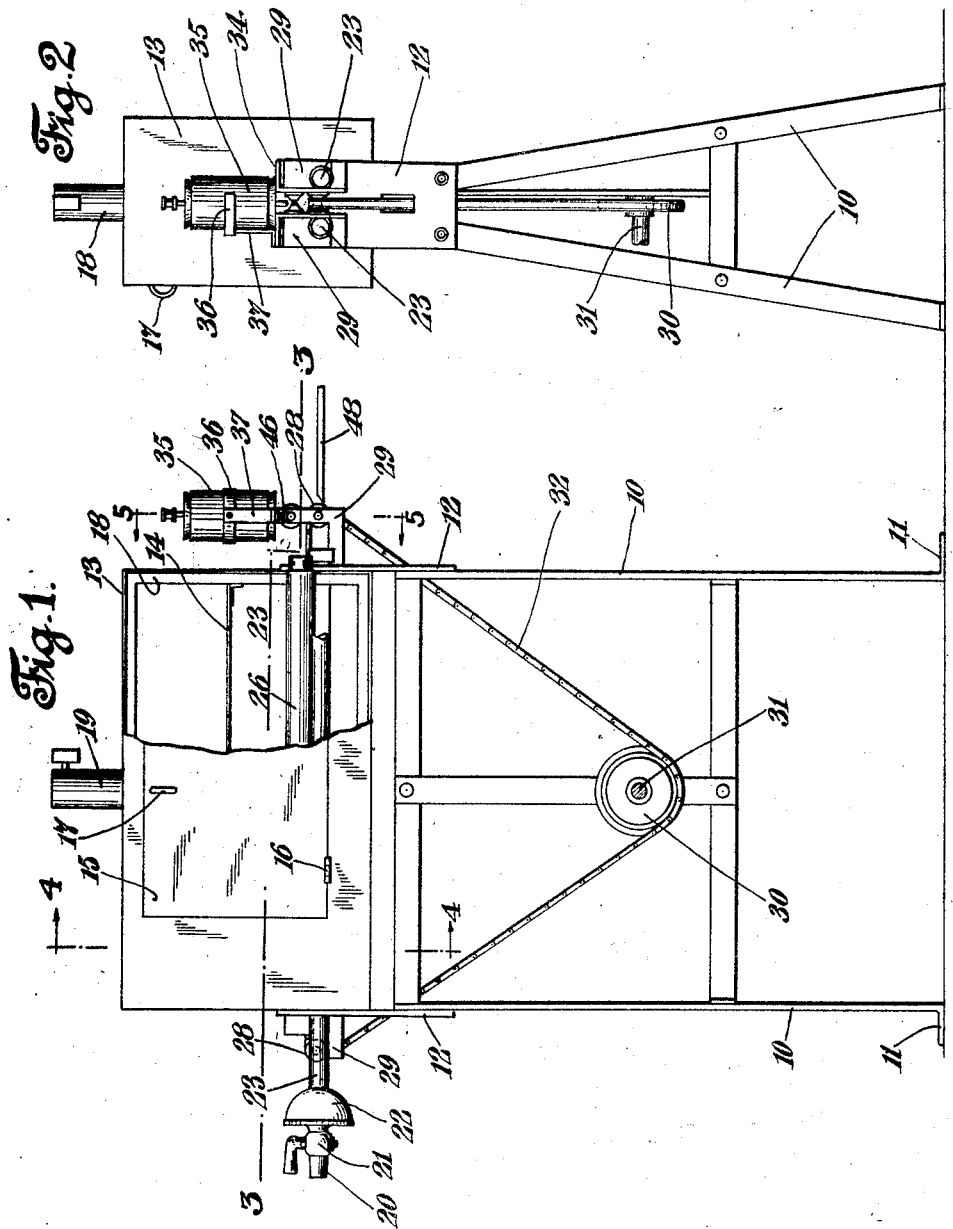
Inventor
Otto Fest
By his Attorney Dec. 1, 1925.
O. FEST
SAUSAGE BROILER
Filed June 26, 1925  2 Sheets-Sheet 2
1,563,973
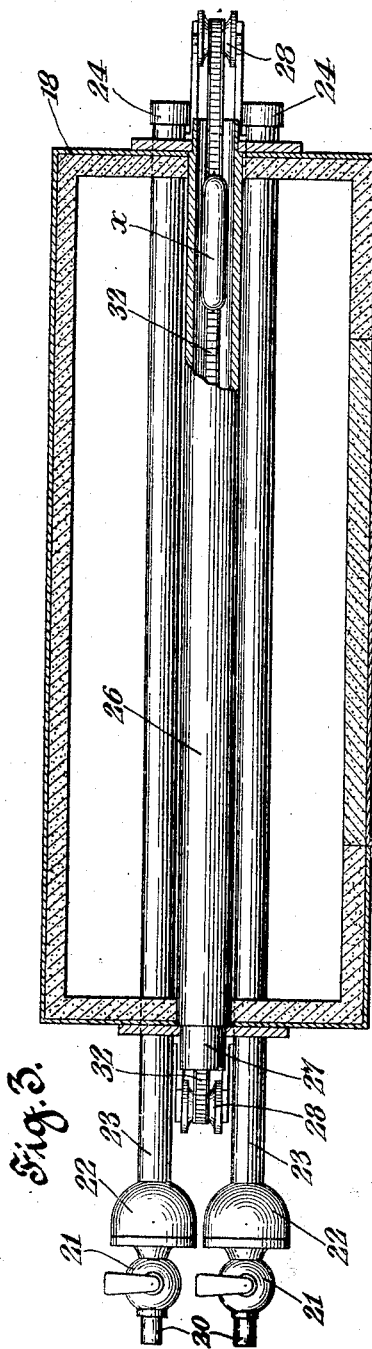
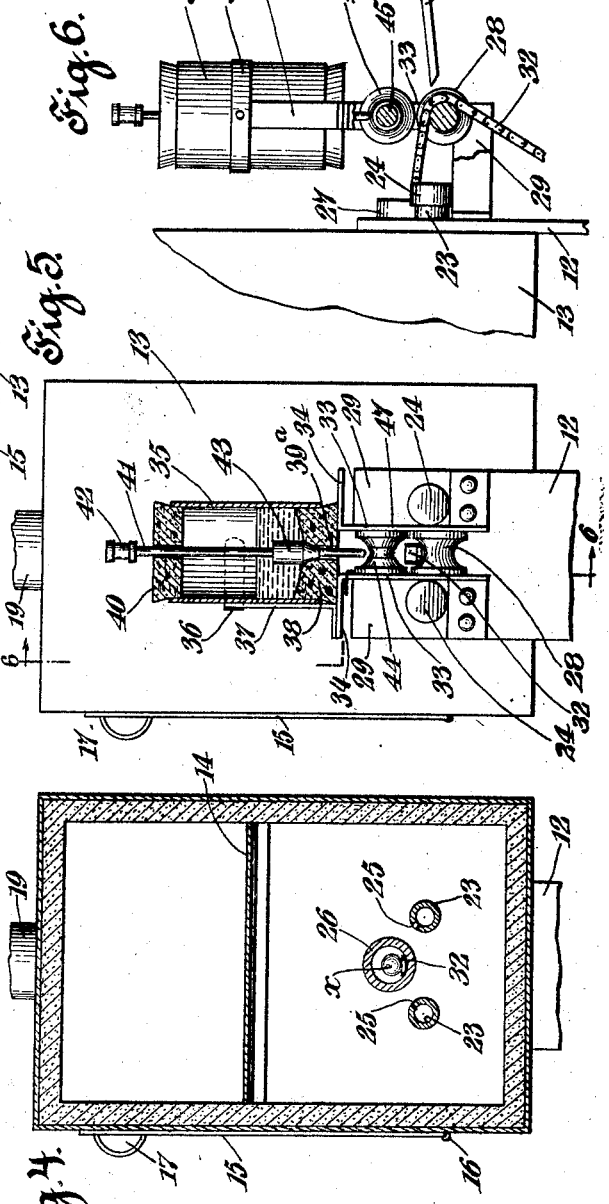
Inventor
Otto Fest
By his Attorney
Frak C. Fischer.

Patented Dec. 1, 1925.

1,563,973

UNITED STATES PATENT OFFICE.

OTTO FEST, OF NEWARK, NEW JERSEY.

SAUSAGE BROILER.

Application filed June 26, 1925. Serial No. 39,662.

*To all whom it may concern:*

Be it known that I, OTTO FEST, a citizen of the Republic of Germany, residing at Newark, in the county of Essex and State of New Jersey, have invented new and useful Improvements in Sausage Broilers, of which the following is a specification.

This invention relates to cooking apparatus and particularly to such as are designed for continuous operation, with special reference to prepared meat foods in sausage form known as frankfurters, wienerwursts or Vienna sausages.

Due to their convenient size, agreeable taste, ease of mastication and nutritive value, these articles have attained an enviable place among food products, having an ever increasing popularity and an enormous sale in a prepared condition ready for immediate consumption.

The ordinary process of preparation includes a metallic plate supported over a stove or heater, such for instance as may be supplied with a plurality of gas jets, the sausages being placed in rows upon the plate and turned from side to side as the cooking progresses.

It is to be noted that cooking under such conditions is far from being uniform, some portions being nearly or quite charred and others substantially raw, and furthermore, the cooking lacks sanitation, being exposed to dust and particles borne in the air to which the articles are freely open, besides the unsanitary methods used in handling them.

It is therefore one of the objects of the instant invention to provide an apparatus in which the sausages are subjected to an even heat from all sides, requiring no turning or touching with the hand, and are enveloped in such manner as to be protected from dust and germ laden air throughout the process of cooking.

A further feature is in the provision of means for controlling the temperature to suit the requirements, the apparatus being capable of operating at a high speed continuously, and the product delivered in a perfectly cooked condition, including all the flavor and juices, with the use of far less gas or other fuel than ordinarily.

Another aim is to produce an apparatus capable of delivering hot frankfurters in their best possible condition, and providing them with a film of mustard or like condiment, if desired, as part of the finished product.

These several important aims and objects, together with other features that will later become apparent, are accomplished by the novel construction and arrangement of parts hereinafter described and shown in the accompanying drawings, forming a material part of this disclosure, and in which:—

Figure 1 is a front elevational view of an embodiment of the invention, parts being broken away to disclose the interior.

Figure 2 is an end elevational view of the same.

Figure 3 is an enlarged longitudinal sectional view taken on line 3—3 of Figure 1.

Figure 4 is a transverse sectional view taken on line 4—4 of Figure 1.

Figure 5 is a partial end elevational and sectional view, the section being taken on line 5—5 of Figure 1.

Figure 6 is a partial front elevational and sectional view, the section being taken on line 6—6 of Figure 5.

The apparatus as shown in the drawings consists of a stand having legs 10 provided with flanges 11 by which it may be secured to a floor, these legs being cross braced and riveted to present a firm structure having at its upper ends a pair of rigid plates 12.

Securely fixed between these plates is an oblong rectangular metallic casing 13 serving as an oven and in which may be fixed a shelf 14 for such purpose as may be required.

A door 15 is provided with hinges 16 at the front side of the oven and furnished with a handle 17, giving access to the interior, the walls of which are lined throughout with sheets 18 of asbestos or other substance of heat non-conducting nature, fumes, if any, and excess heat passing out through a chimney 19 on top of the oven.

At one end of the apparatus a pair of gas pipes 20, provided with cocks 21, enter heads 22 connecting with tubes 23 passing in spaced parallel relation longitudinally through the oven and its support plates 12, to terminate in caps 24 at their opposite ends, these tubes having a plurality of perforations 25 through which gas passes to be ignited within the oven.

Midway between and slightly above the burner tubes 23 is a thick-walled steel tube 26 passing lengthwise through the oven, its reduced open ends 27 extending outward past the plate supports 12 at each end.

Grooved carrier rollers 28 are rotatably mounted in pairs of angle brackets 29 fixed on the ends of the apparatus and so arranged that the peripheries of the grooves are in register with the oven tube 26, slightly below its axial plane, as best seen in Figure 6.

A driving pulley 30 is mounted in the stand, midway its length, and below the oven, on a spindle 31, driven by hand or motor as may be desired, this pulley driving an endless chain 32, trained over the rollers 28 and through the oven tube 26, passing closely adjacent its inner lower surface.

It will now be understood that if sausages indicated at X Figure 3, be placed on the surface of the travelling chain 32, at the left hand end of the machine, the gas having been previously lit and the oven tube 26 heated to a proper degree, the sausages will be delivered at the other end of the machine in a thoroughly and uniformly cooked condition, ready to be consumed.

It will be clear that the speed of the chain may be varied to suit and the gas controlled in conformity with the requirements, sufficient only being required to maintain the tube 26 at such heat as will broil the food during its passage.

In addition to the foregoing a pair of raised supports 33 have outturned flanges 34 forming a seat for a cylindrical glass container 35, held thereon by a pair of partially encircling spring arms 36 at the upper end of a support 37 secured to one of the flanges 34.

The container has in its lower end a plug 38, such as a cork, having a concave upper face through which is an axial opening 39 and a conical valve seat at the upper end of the opening.

A similar tapered closure 40 is entered in the top of the receptacle 35 through which freely passes a rod 41 having a weight 42 on its extending top, and near the lower end is fixed a valve plug 43 controlling the entrance to the passage 39, the stem extending below the lower closure as best seen in Figure 5.

This container is adapted to hold mustard or like semi-liquid mass to be used as a condiment and is applied automatically in the following manner.

A grooved roller 44 is provided with a spindle 45 freely operable in slots 46 in the supports 33, the spindle normally resting at the bottom of the slots, directly above and spaced from the adjacent roller 28 over which the chain 32 operates.

When this chain engages a sausage and causes it to advance over the delivery roller 28, it will, due to its diameter, raise the roller 44, which is directly under the lower end of the rod 41, raising the valve 43 and releasing a portion of the contents of the container which, passing down through the opening 39, is delivered on the grooved surface of the roller and transmitted to the sausage, passing between the rollers.

The upper, dispensing roller 44 is provided with a groove 47 at its center, which aids materially in applying the condiment, which is delivered in a thin stream upon the surface of the sausage, just prior to its discharge from the chain upon a receiving plate 48, where it is accessible.

It will be understood that the mustard applying device may be omitted if preferred and that the scope of the invention includes the use of any form of heating device that may be desired.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:—

1. A sausage broiler comprising an oven having heat insulated walls, a door in the side of said oven, means for supporting the oven, a tube fixed in the end walls of the oven, gas pipes arranged parallel to said tube, said pipes having jet openings to impinge on said tube, control means for said pipes, rollers at the ends of said tube, and an endless chain disposed over said rollers to travel through said tube.

2. A sausage broiler comprising an oven having heat insulated walls, a door in the side of said oven, means for supporting the oven, a tube fixed in the end walls of the oven, gas pipes arranged parallel to said tube, said pipes having jet openings to impinge on said tube, ventilating means for the oven, a conveyor passing through the tube, and means for actuating said conveyor.

3. A sausage broiler comprising a stand, a rectangular oven mounted on the stand, a heavy walled tube fixed in the ends of said oven to extend at each end, controllable means for imparting heat to said tube over its entire length, grooved rollers at the ends of said tube, a roller on said frame, a conveyor chain trained over all of said rollers and passing through said tube, and a platform at the end of said tube to receive articles passed therethrough.

4. A sausage broiler comprising a stand, an oven supported by said stand, a tube fixed in said oven, said tube having open extending ends, a travelling conveyor passing through the tube, means for guiding and advancing said conveyor, means for applying heat to opposite sides of said tube and means to receive an article passed through the tube.

5. A sausage broiler comprising a stand, a heat insulated casing supported by the stand, an oven tube fixed at its ends in said casing, said tube having open ends, controllable means in said casing to heat said tube, a conveyor movable through the tube, and means actuated by the passage of an article through the tube for applying a condiment thereto.

6. A sausage broiler comprising a stand, a heat insulated casing supported by the stand, an oven tube fixed at its ends in said casing, said tube having open ends, controllable means in said casing to heat said tube, rollers at the ends of said tube, a roller on said stand, an endless conveyor chain trained over all of said rollers to pass through said tube, a mustard container at the delivery end of said tube, and means for automatically dispensing mustard from said container upon a sausage as delivered from said container.

This specification signed and witnessed this 25th day of June, 1925.

OTTO FEST.